April 8, 1930.  A. M. GOODLOE  1,753,653
AIR FILTER
Filed Dec. 10, 1926   2 Sheets-Sheet 1

INVENTOR
Alfred M. Goodloe
BY
his ATTORNEY

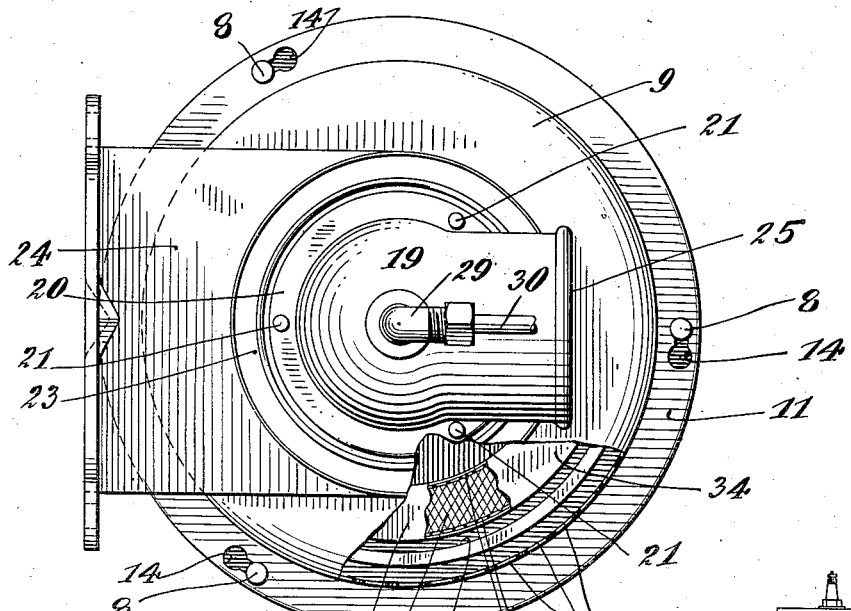
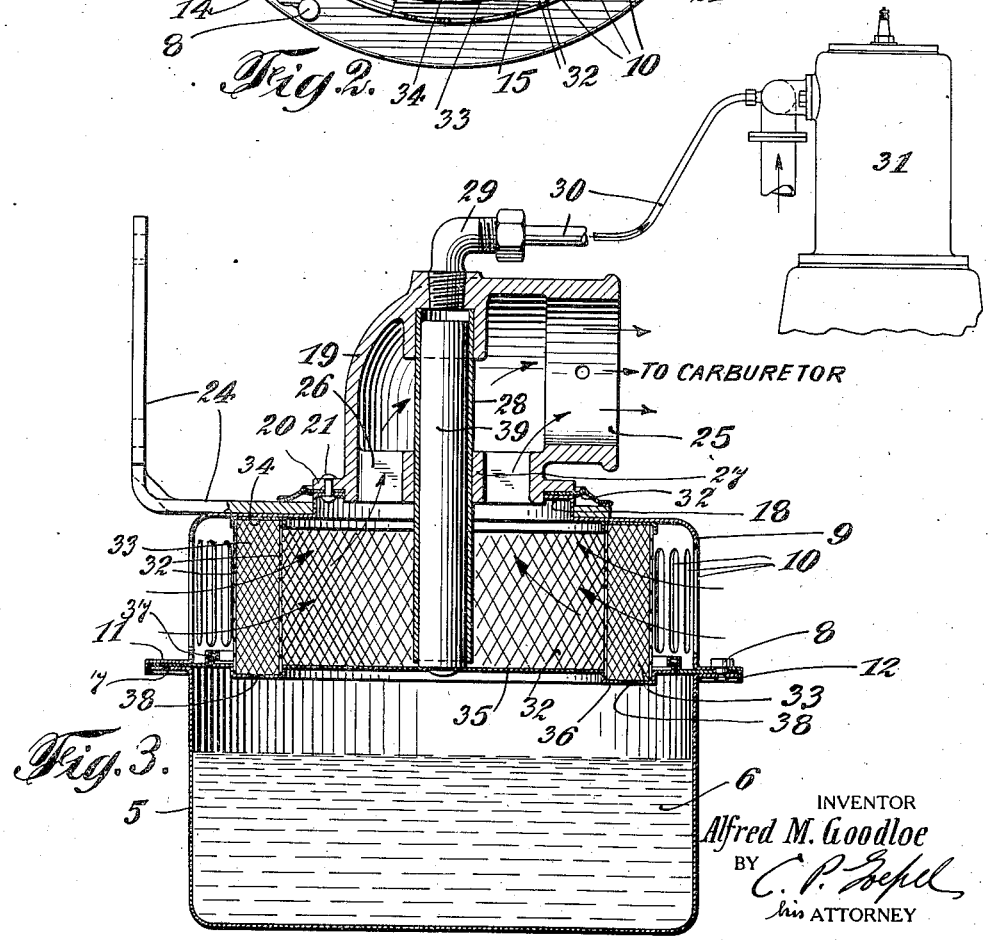

Patented Apr. 8, 1930

1,753,653

UNITED STATES PATENT OFFICE

ALFRED M. GOODLOE, OF BRADFORD, PENNSYLVANIA, ASSIGNOR, BY MESNE ASSIGNMENTS, TO AMERICAN AIR FILTER COMPANY, OF LOUISVILLE, KENTUCKY, A CORPORATION OF DELAWARE

AIR FILTER

Application filed December 10, 1926. Serial No. 153,996.

This invention relates to air filters, and more particularly to means for supplying filtered air to the carburetor of a motor vehicle engine.

In its broader aspect, the present invention is primarily characterized by the provision of a filter having an air inlet and an outlet for connection with the carburetor together with a normally inoperative filter unit and a connection between the filter and the motor for automatically actuating a movable part when the motor is started to cause the air to flow through said filter unit.

More specifically in a preferred embodiment of the invention, I provide a bodily movable filter unit normally submerged in a liquid and from which the air is to be excluded and means connected with the intake manifold of the motor to subject a part connected with the filter unit to the vacuum therein and thus lift the filter unit from the liquid into the path of flow of the air.

It is also another object of the invention to provide a means operating to automatically seal communication between the liquid holding chamber and the air conduit through the filter when the filter unit is moved to its operative position, and thus prevent the liquid from being sucked into the air stream.

It is also an important object of the invention to provide a simple mounting for the air filter as a whole which is readily applicable to various types of motor vehicles and whereby said filter may be easily adjusted relative to the part by which it is supported to position the air outlet connection to the carburetor in the most suitable and convenient location as the particular conditions may require.

With the above and other objects in view, the invention consists in the improved air filter, and in the form, construction and relative arrangement of its several parts as will be hereinafter more particularly described, illustrated in the accompanying drawings and subsequently incorporated in the subjoined claims.

In the drawings, wherein I have illustrated one simple and practical embodiment of the invention, and in which similar reference characters designate corresponding parts throughout the several views,—

Fig. 2 is a top plan view, certain parts being broken away, and

Fig. 3 is a view similar to Fig. 1 on a reduced scale showing the air filter unit in its operative position and the filter connected with a motor vehicle engine.

Figure 1:
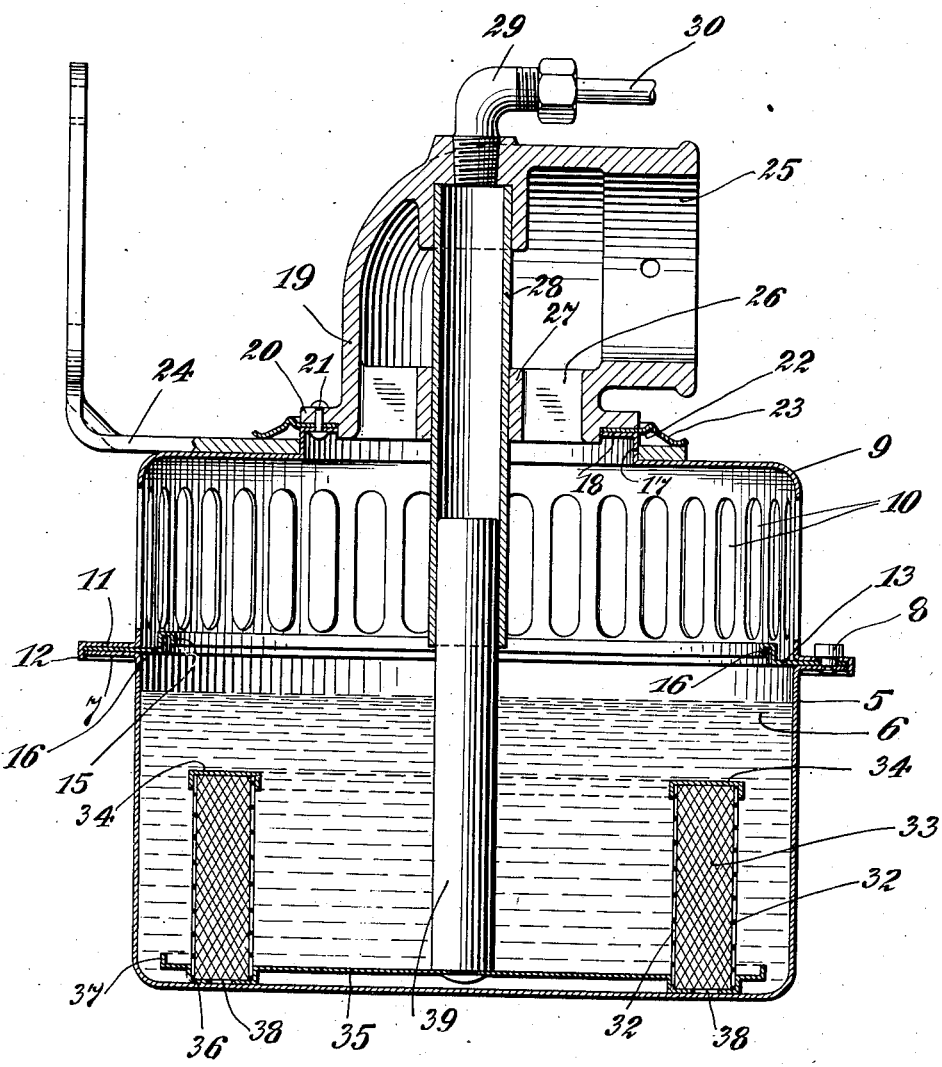
Figure 1 is a vertical sectional view of an air filter embodying my present improvements showing the same substantially full size with the air filter unit in its normal inoperative position.

Referring in detail to the drawing, the filter construction which I have selected for purposes of illustration includes a two-part casing or housing. The lower section 5 of this housing constitutes a container or reservoir for a more or less adhesive liquid such as viscosine indicated at 6. Preferably, the casing is of cylindrical form and the wall of the casing section 5 at its upper end is provided with an outwardly projecting annular flange 7 in which a plurality of headed studs 8 are fixed.

The upper section 9 of the casing is provided in its cylindrical body wall with a multiplicity of suitably spaced and shaped air inlet openings 10. Said wall at its lower edge has an outwardly extending flange 11 thereon provided at its outer edge with the relatively narrow annular lip 12 which is adapted to extend downwardly over the edge of the flange 7 on the lower casing section 5.

Between the flanges 7 and 11 of the two casing sections, the outer portion of an annular plate 13 is interposed, said plate having suitably spaced openings to receive the shanks of the studs 8. The flange 11 of the upper casing section is provided with bayonet or keyhole slots shown at 14 whereby said flange may be releasably connected with the heads of the studs 8, thus detachably holding the two casing sections and the interposed plate 13 in assembled relation. The plate 13 at its inner edge is formed with an upwardly projecting angular flange 15 thereon providing the annular channel or groove 16, the purpose of which will be hereinafter explained.

The top wall of the upper casing section 9 is formed with an upwardly extending concentrically located cylindrical neck 17 having an inwardly projecting flange 18 at its upper edge surrounding an opening in which one end of the cast metal elbow 19 is engaged. This end of said elbow is formed with an external annular flange 20 which is adapted to be fixedly secured to the flange 18 by suitable rivets 21. These rivets also secure the inner edge of an annular disc 22 between the flanges 20 and 18. The outer edge portion of this disc is resiliently yieldable and obliquely inclined as at 23 and bears upon the upper surface of the horizontal arm of a supporting bracket 24 through an opening in which the neck 17 on the casing section 9 is loosely positioned. Thus, it will be understood that the entire filter together with the elbow connection 19 may be rotatably adjusted upon the arm of the supporting bracket 24 whereby the air outlet 25 of said elbow member may be conveniently connected to a tube or hose with the air inlet of the carburetor of the motor. Within the inlet end of the elbow 19 a suitably formed spider 26 having a central sleeve 27 is provided.

A tube 28 is suitably fixed at its upper end to the top of the elbow 19 and also within the sleeve 27 and extends downwardly through the upper casing section 9 to a point substantially in line with the flange 15 on the plate 13. A nipple 29 connected with the elbow 19 communicates with the upper end of said tube 28 and is adapted for connection by a pipe, tube or other suitable form of conduit indicated at 30 to the intake manifold of an internal combustion engine indicated at 31 in Fig. 3 of the drawings.

The filter unit per se, as herein shown, is in the form of a cylinder or drum consisting of spaced inner and outer concentric walls 32 of expanded metal, wire screen or other perforate or reticulated material and between which a suitable filtering medium indicated at 33 is compactly held. The space between the two walls 32 at their upper ends is closed by a suitably formed cap plate 34 and a plate 35 closes the lower end of the inner cylindrical wall 32 and is formed with an annular channel shaped portion 36 which receives the lower edge of the cylindrical filter body. The outer edge of plate 35 in spaced relation to the channel 36 is provided with an upwardly projecting annular lip 37 thereon. The wall of the channel 36 below the filter body is provided with a plurality of drainage openings 38.

The lower end of a rod 39 is centrally fixed to the plate 35, said rod being of such length that when the filter unit is in its normal position as seen in Fig. 1, the upper end of this rod extends into the tube 28.

In the operation of the invention as above described, when the engine of the motor vehicle is not being operated, the filter unit is wholly submerged within the body of liquid contained in the lower section 5 as seen in Fig. 1 of the drawings, thus excluding the air and dust and dirt which may enter through the openings 10 of the upper casing section from contact with said filter unit.

As soon as the engine is started in operation, suction occurs in the tube 28 through the connection 30 with the intake manifold which acts upon the rod 39 and slowly raises or lifts the filter unit from its submerged position in the liquid 6 to an elevated position wholly above the liquid and in the path of flow of the air from the inlets 10 to the outlet 25 of the elbow connection 19. The internal diameter of tube 28 is properly calculated so that the speed with which the filter unit is thus lifted is sufficiently slow to permit the excess liquid to drain off through openings 38 from the filtering medium so that this liquid will not be entrained with the air and drawn into the carburetor. When the filter unit is thus moved to its working or operative position, it will be seen from reference to Fig. 3 that the upstanding lip 37 on the plate 35 is engaged in the annular groove 16 of the plate 13, thus providing a more or less effective seal which prevents the liquid from splashing upwardly and outwardly through the air inlet openings 10, when the body of liquid is violently agitated, as when the vehicle is turning sharp curves. The top plate 34 of the filter unit is held in close contact against the top wall of the casing section 9 so that all of the air entering through openings 10 must pass through the filtering medium, thus insuring the entrance of nothing but filtered air to the carburetor. As soon as the engine is stopped, the filter unit and rod 39 will automatically drop by gravity into the body of liquid 6, thus cleaning the filtering medium and removing accumulations of dust and dirt therefrom and recharging the filtering medium with a film of the liquid when it is again raised to its operating or working position.

It is a known fact that most of the carbon which forms on the tops of the pistons and the upper portions of the cylinder walls in an internal combustion engine is due to dirt and dust which is drawn or sucked with the air through the carburetor. It will be seen that my present improvements provide an air filter which is automatically maintained at its highest operating efficiency, in that when the engine is started the filter becomes operative to remove all dust and dirt particles from the air supplied to the carburetor and when the engine is stopped, the filter medium is automatically cleaned and is protected against the possible accumulation of dust and dirt entering through the air inlets 10 while the engine is idle. Therefore, by means of my present improvements, this impediment to the proper operation of motor vehicle engines may be largely overcome.

It will of course, be understood that for differently powered engines, different sizes of the filter will be required. I have ascertained by test, that for a small powered engine of the four cylinder type, a one-half inch internal diameter of the tube 28 will produce a sufficient vacuum or suction in said tube to lift a weight of two pounds which greatly exceeds the actual requirements. I have also found that a filter unit of the cylindrical drum shaped type is preferable, as tests have shown that with a filter of this type, none of the viscosine or adhesive liquid will be entrained by the air passing through the filter medium. When using a flat type filter, the viscosine is collected in a glass jar connected to the outlet 25 closely adjacent to the filter to a depth of approximately one-eighth inch. However, it will be understood that, in so far as the automatic action controlled by the motor vehicle engine for moving the filter unit from the inoperative to the working position is concerned, other types of such filter units might possibly be designed whereby this difficulty could be avoided and therefore, the present invention is not to be unnecessarily limited to the use of a cylindrical or drum type filter.

In mounting the filter in position upon an automobile, the vertical arm of the bracket 24 is attached to a convenient part of the chassis or frame of the vehicle, and the entire filter together with the elbow 25 is then rotated on the horizontal bracket arm. The resilient flange 23 of plate 22 bearing at its edge upon the upper surface of this arm will normally hold the filter against casual rotation from its adjusted position. In this manner, it is easily possible to most conveniently locate the outlet 25 for connection with the carburetor of the particular type of motor vehicle engine to which my invention is applied.

When it becomes necessary to renew the liquid 6 in the lower casing section or to more thoroughly cleanse or repair the filter unit, the lower casing section is rotated in the proper direction relative to the upper casing section to position the heads of the studs 8 in line with the large ends of the bayonet slots 14. The lower casing section then can be readily detached and the filter unit removed. After the clean liquid has been placed in the casing section, it can then be easily and quickly again connected with the upper section of the casing.

From the foregoing description considered in connection with the accompanying drawings, it will be seen that I have provided a very simply constructed and efficiently operating air filter for motor vehicle engines. Since the various parts are of rugged and substantial construction, it will be appreciated that after the device has been once applied, it requires no further attention on the part of owner of the vehicle other than to renew the viscosine or other adhesive liquid at infrequent intervals. By the use of such an automatic air filter, the proper filtering of the air supplied to the carburetor and the removal of all dust and dirt particles therefrom is assured. It is an inevitable consequence of the use of such air filters on automobiles, wherein the filter medium remains stationary, that after a short period of use this filtering medium will become so clogged with accumulations of dust and dirt that there will be an insufficient volume of air supplied to the carburetor, and the air that does enter therein contains more or less dust and dirt collected in the passage of the air through the filtering medium.

In the accompanying drawings, I have illustrated a particular design of my improved air filter, but it is apparent that the essential features of the present disclosure might also be utilized in various other mechanical forms of the several structural elements. Accordingly, it is to be understood that I reserve the privilege of resorting to all such legitimate modifications thereof as may be fairly incorporated within the spirit and scope of the invention as claimed.

I claim:

1. In combination with an air conduit having an inlet and an outlet leading to the point of utilization of filtered air; an air filtering medium associated with said conduit and normally isolated from air contact, and means responsive to a suction at the point of utilization to cause the air entering said conduit to flow through said filtering medium.

2. In combination with an air conduit having an inlet and an outlet leading to the point of utilization of filtered air; an air filtering medium associated with said conduit and normally isolated from air contact, and means automatically and synchronously responsive to the influence of suction at the point of utilization to cause the air to be drawn into the conduit at the inlet thereof only through said filtering medium.

3. In combination with an air conduit having an inlet and an outlet leading to the point of utilization of filtered air; a movable filter cell associated with said conduit and normally disposed in an operative position with respect thereto, and means connected to said cell and responsive to a suction at the point of air utilization to move said filter cell from such inoperative position to a position in the path of flow of the air at the inlet to the conduit.

4. In combination with an air conduit having an inlet and an outlet leading to the point of utilization of filtered air; a liquid container associated with said conduit, an air filter cell normally submerged in the liquid in said container, and means connected to said cell and responsive to a suction at the point of utilization and operating synchronously with the initiation of such air flow to bodily displace the filter cell from the liquid and position said cell in the path of flow of the air through said conduit.

5. In combination with an air conduit having an inlet and an outlet leading to the point of utilization of filtered air; a bodily movable filter cell, a protective housing for the filter cell associated with the conduit and supporting the cell in a normally inoperative position, and means connected with said filter cell responsive to and automatically actuated by a suction at the point of air utilization and operable synchronously with the initiation of such air flow to bodily move the filter cell from its inoperative position to an operative position in the path of flow of the air entering said conduit.

6. In combination with air induction producing means, an air filter having a conduit provided with an air inlet and an air outlet connected with said means, an air filtering medium, means normally isolating said filtering medium from air contact, and means subject to the influence of the vacuum produced by said induction producing means for causing the air entering the conduit inlet to pass through said filtering medium.

7. In combination with air induction producing means, an air supply conduit connected with said means, an air filtering medium associated with said conduit at the inlet thereof, means normally isolating said filtering medium from air contact, and means for automatically rendering said filtering medium effective to filter the air entering said conduit upon the operation of the induction producing means.

8. In combination with an air induction producing means, an air supply conduit connected with said means, and air filtering means associated with said conduit at the inlet thereof including a movable air filter cell normally disposed out of the path of flow of air into said conduit, and means connected with said cell and subject to suction when said induction producing means is operated, to move the filter cell to an operative position in the path of flow of the air entering said conduit.

9. In combination with an air induction producing means, an air supply conduit having an inlet and an outlet connected with said means, and air filtering means associated with said conduit at the inlet thereof including an air filter cell movable by gravity to a normally inoperative position out of the path of flow of the air, and means connected with said filter cell for subjecting said filter cell to suction when said induction producing means is operated, to lift the filter cell to an operative position in the path of flow of the air entering the conduit.

10. In combination with air induction producing means, an air supply conduit having an inlet and an outlet connected with said means, air filtering means associated with the inlet of said conduit including a movable filter cell, means connected with said filter cell for subjecting the filter cell to the influence of suction when the induction producing means is operated to move said filter cell into the path of flow of the air entering said conduit, said filter cell moving by gravity to a normally inoperative position when the operation of said means is stopped, and means to act upon the filtering medium upon the return of the cell to its normal position to remove accumulations of dust and dirt therefrom.

11. In combination with an air induction producing means, an air supply conduit having an inlet and an outlet connected with said means, air filtering means including a bodily movable filter cell, a liquid container connected with the conduit and supporting the filter cell in a normally inoperative position out of the path of flow of the air, means connected with said filter cell for subjecting the filter cell to suction when the induction producing means is operated to move the filter cell to an operative position in the path of flow of the air entering the conduit, said cell dropping by gravity into the liquid in said container when the operation of said means is stopped, whereby the filtering medium in said cell is cleaned and the access of dust and dirt thereto prevented by the liquid.

12. In combination with an induction producing means, an air supply conduit having an inlet and an outlet connected with said means, air filtering means including a bodily movable filter cell, a liquid container connected with the conduit and supporting the filter cell in a normally inoperative position out of the path of flow of the air, means connected with said filter cell for subjecting the filter cell to suction when the induction producing means is operated to move the filter cell to an operative position in the path of flow of the air entering the conduit, said cell dropping by gravity into the fluid in said container when the operation of said means is stopped whereby the filtering medium in said cell is cleaned and the access of dust and dirt thereto prevented by the liquid, and means automatically acting when the filter cell is lifted to its operative position to seal communication between said container and the inlet of the conduit.

13. In combination with an air induction producing means; an air supply conduit having an inlet and an outlet connected with said means, air filtering means associated with the inlet of the conduit including a casing having an upper section provided with air inlets in its wall and a lower section constituting a reservoir for a viscous liquid, a cylindrical filter cell adapted for movement in the line of its axis from a normally inoperative position in said reservoir, a fixed guide tube, a rod centrally fixed to the filter cell and movable in said tube, and a conduit connecting the interior of the tube with said induction producing means to thereby produce a vacuum within said tube when the induction producing means is operated and lift the filter cell from its normal position to an operative position in the path of flow of the air into the inlet of said first named conduit, and said filter cell returning by gravity to its normal position in the viscous liquid when the operation of the engine is stopped.

14. In combination with an air induction producing means; an air supply conduit having an inlet and an outlet connected with said means, air filtering means associated with the inlet of the conduit including a casing having an upper section provided with air inlets in its wall and a lower section constituting a reservoir for a viscous liquid, a cylindrical filter cell adapted for movement in the line of its axis from a normally inoperative position in said reservoir, a fixed guide tube, a rod centrally fixed to the filter cell and movable in said tube, and a conduit connecting the interior of the tube with said induction producing means to thereby produce a vacuum within said tube when the induction producing means is operated and lift the filter cell from its normal position to an operative position in the path of flow of the air into the inlet of said first named conduit, said filter cell and the casing being provided with coacting means automatically sealing communication between the upper and lower casing sections when the filter cell is moved to its operative position, and said filter cell returning by gravity to its normal position in the viscous liquid when the operation of said means is stopped.

15. Filtering means for the carburetor air supply of internal combustion engines comprising a casing having air inlet openings in its wall and an outlet member for the filtered air and a filter cell in said casing, a supporting bracket for the filter, and means for rotatably mounting the filter upon said bracket and including a part cooperating with the bracket to yieldably resist rotation of the filter and permit the egress end of the outlet member to be properly positioned for connection to the carburetor of the engine.

In testimony that I claim the foregoing as my invention, I have signed my name hereto.

ALFRED M. GOODLOE.